(12) United States Patent
Lee

(10) Patent No.: US 8,585,217 B2
(45) Date of Patent: Nov. 19, 2013

(54) BIDIRECTIONAL PROJECTOR

(75) Inventor: Chun-Yen Lee, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 103 days.

(21) Appl. No.: 13/181,089

(22) Filed: Jul. 12, 2011

(65) Prior Publication Data

US 2012/0206697 A1    Aug. 16, 2012

(30) Foreign Application Priority Data

Feb. 15, 2011   (TW) .............................. 100104983 A

(51) Int. Cl.
 *G03B 21/28* (2006.01)
(52) U.S. Cl.
 USPC ................... 353/99; 353/30; 353/31; 353/34; 353/101; 353/122; 362/284; 348/744
(58) Field of Classification Search
 USPC ........... 353/30, 31, 33, 34, 69, 70, 46, 48, 49, 353/50, 51, 101, 82, 99, 119, 122; 349/5, 349/7–9; 348/740, 742, 743, 744; 362/284, 362/257
 See application file for complete search history.

(56) References Cited

U.S. PATENT DOCUMENTS

| 5,633,755 | A  | * | 5/1997 | Manabe et al. ............... 359/443 |
| 7,828,444 | B2 | * | 11/2010 | Lai et al. ........................ 353/33 |
| 7,901,084 | B2 | * | 3/2011 | Willey et al. .................... 353/49 |
| 2009/0009730 | A1 | * | 1/2009 | Destain ............................ 353/84 |
| 2009/0309959 | A1 | * | 12/2009 | Iwai et al. ....................... 348/54 |

* cited by examiner

*Primary Examiner* — Georgia Y Epps
*Assistant Examiner* — Sultan Chowdhury
(74) *Attorney, Agent, or Firm* — Tracy M. Heims; Apex Juris, pllc

(57) ABSTRACT

A bidirectional projector, which may project slides onto two screens at the same time, includes a light source emitting red beam, green beam, and blue beam; at least an imaging device receiving the red beam, the green beam, and the blue beam from the light source and reflecting predetermined parts of the red beam, the green beam, and the blue beam to form an image beam according to image signals; and an optical lens, wherein the image beam emits to the optical lens and a part of the image beam passes through the optical lens to form a first projecting beam, and a part of the image beam is reflected by the optical lens to form a second projecting beam.

3 Claims, 7 Drawing Sheets

BIDIRECTIONAL PROJECTOR

BACKGROUND OF THE INVENTION

1. Field of the Invention

The present invention relates generally to a projector, and more particularly to a bidirectional projector.

2. Description of the Related Art

Projectors are widely used in conferences, speeches, and classes to show information to audiences. The conventional projector only may project the slides onto one screen, and the screen must face the audiences that the speaker has to turn to the screen and turn to the audiences frequently in the speech. Sometime, the speaker may block the screen.

Besides, the conventional projector only projects slides onto one screen that the audiences at the back of a large conference place cannot clearly see the screen. In order to solve this problem, it usually has to arrange other projectors at different places that all of the audiences may clearly see the screen. However, it has to have plural of projectors and that will cost you much higher.

SUMMARY OF THE INVENTION

The primary objective of the present invention is to provide a bidirectional projector, which may project slides onto two screens in the same time.

According to the objective of the present invention, the present invention provides a bidirectional projector including a light source emitting red beam, green beam, and blue beam; at least an imaging device receiving the red beam, the green beam, and the blue beam from the light source and reflecting predetermined parts of the red beam, the green beam, and the blue beam to form an image beam according to image signals; and an optical lens, wherein the image beam emits to the optical lens and a part of the image beam passes through the optical lens to form a first projecting beam, and a part of the image beam is reflected by the optical lens to form a second projecting beam.

DETAILED DESCRIPTION OF THE INVENTION

Figure 1:
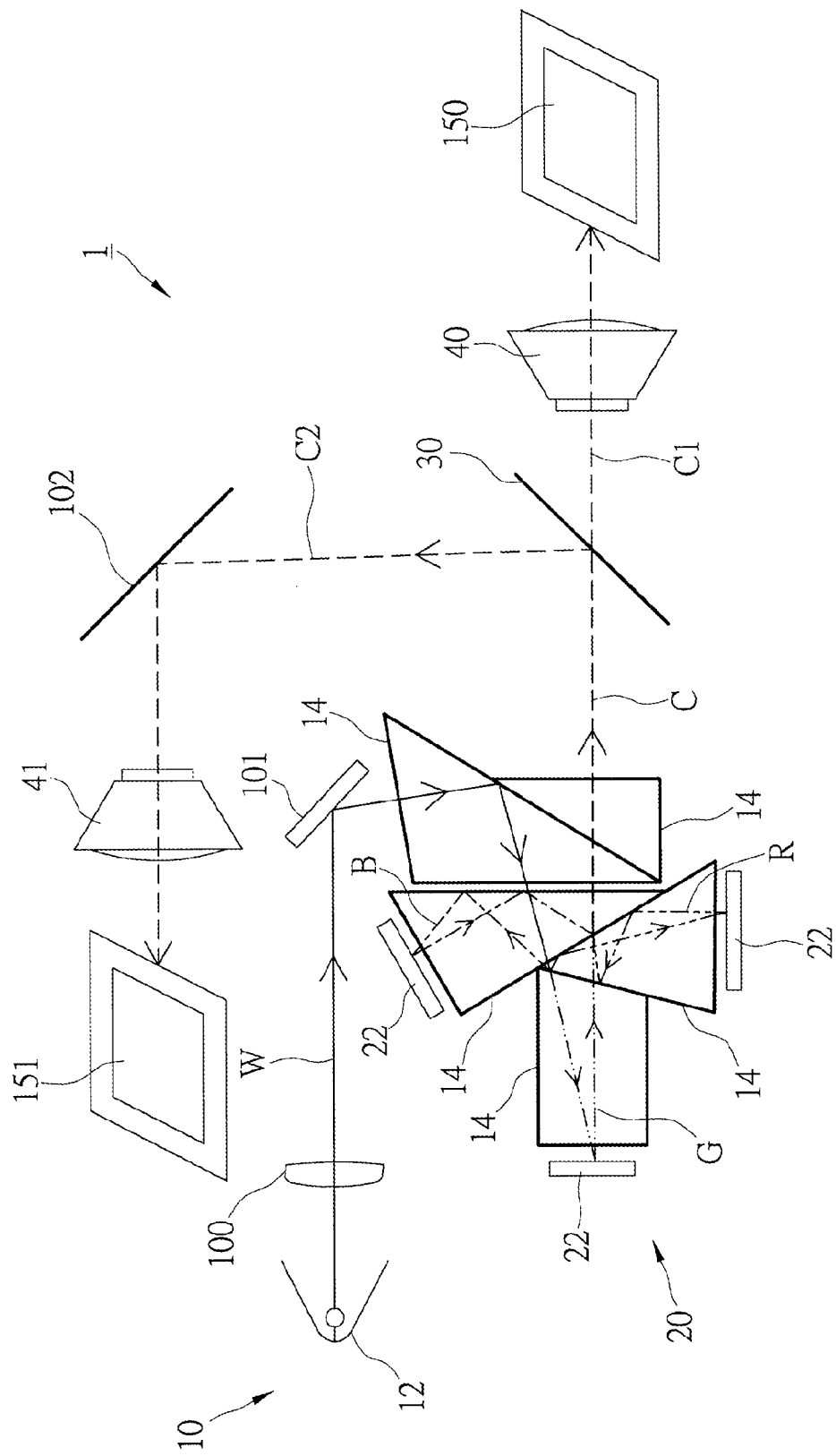
FIG. 1 is a sketch diagram of a first preferred embodiment of the present invention.

As shown in FIG. 1, a bidirectional projector 1 of the first preferred embodiment of the present invention includes a light source 10, an imaging device 20, an optical lens 30, a first imaging lens 40, and a second imaging lens 41.

The light source 10 includes a white light lamp 12 and plural of splitting prisms 14. The white light lamp emits white light to a condenser 100 to form a white beam W, and then the white beam W emits to the splitting prisms 14 through a reflector 101. The splitting prisms 14 split the white beam W to emit red beam R, green beam G, and blue beam B in predetermined directions. It may utilize other ways for beam-splitting, such as white light lamp associated with color lenses, or directly utilizing red light lamp, green light lamp, and blue light lamp.

The imaging device 20, to which image signals are input, includes three digital micromirror devices (DMD) 22 to receive the red beam R, the green beam G, and the blue beam B from the light source 10. The DMDs 22 may reflect predetermined parts of the red beam R, the green beam G, and the blue beam B to the splitting prisms 14 according to the image signals, and these reflected beams are combined into an image beam C after the splitting prisms 14. The DMD is a conventional device in the present field, and its structure, arrangement, and function are well known in the present field, so we do not describe the detail here. Except for DMDs as described above, there are some equivalent devices for the imaging device 20, such as single DMD, liquid crystal display (LCD), liquid crystal on silicon (LCoS), grating light valve (GLV), or other devices which may form the image beam from R, G, B beams.

Figure 2:
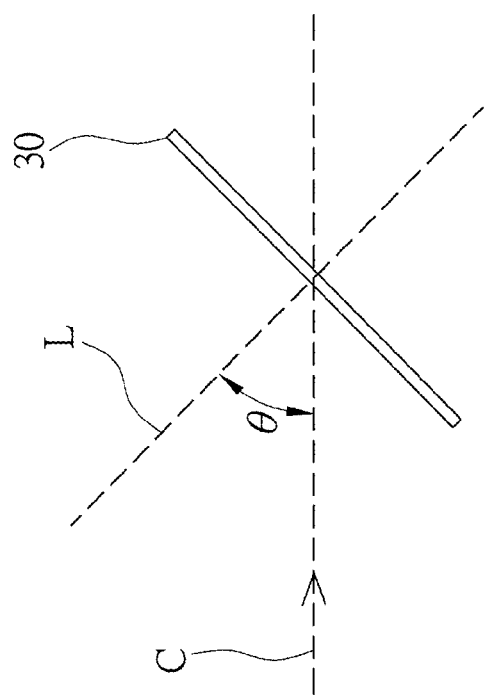
FIG. 2 is a sketch diagram of the arrangement of the lenses of the first preferred embodiment of the present invention.

The optical lens 30 includes a beam-splitter arranged between the imaging device 20 and the first imaging lens 40 that the image beam C from the imaging device 20 may emit through the optical lens 30. The beam-splitter 30 may split the image beam C into a first projecting beam C1 and a second projecting beam C2. As shown in FIG. 2, the image beam C emits to the beam-splitter 30 with an incidence angle θ between 0 and 90 degrees (the line L is the normal of the beam-splitter 30), and the preferable incidence angle θ is between 40 degrees and 50 degrees.

The first projecting beam C1 emits to the first image lens 40 to image the first projecting beam C1 onto a first image member 150. The second projecting beam C2 emits to the second image lens 41 to image the second projecting beam C2 onto a second image member 151. The image members 150, 151 may be screen, wall, glass, or other relative devices on which the beam may be imaged.

It may provide a reflector 102 to change the direction of projection of the projector 1 of the present invention. The reflector 102 is arranged between the optical lens 30 and the second image lens 41 to reflect the second projecting beam C2 to the second image lens 41 that the second image lens 41 may be arranged at any position.

Figure 3:
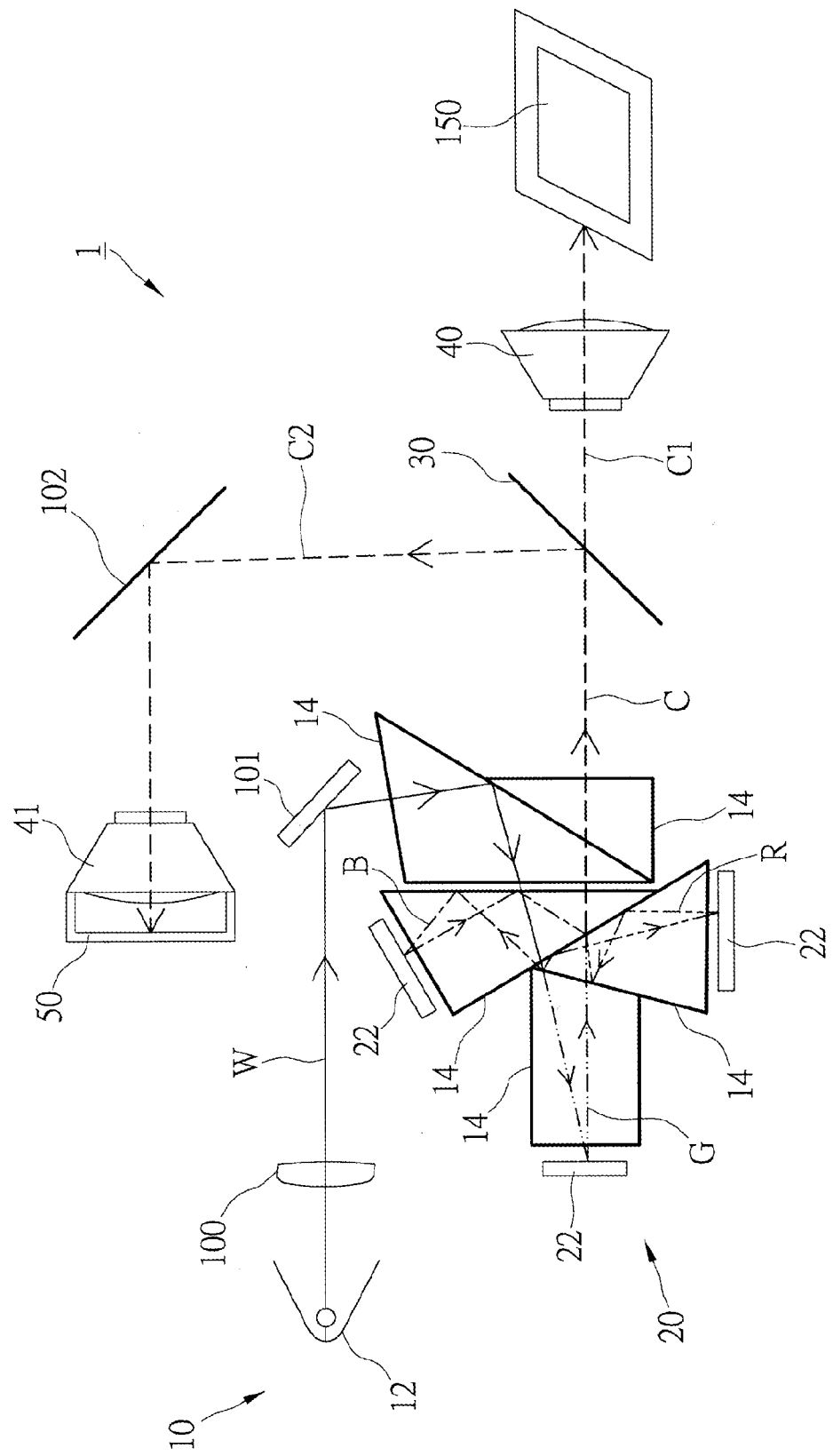
FIG. 3 and FIG. 4 are sketch diagrams of the first preferred embodiment of the present invention, showing a mask covering the second imaging lens.
Figure 4:
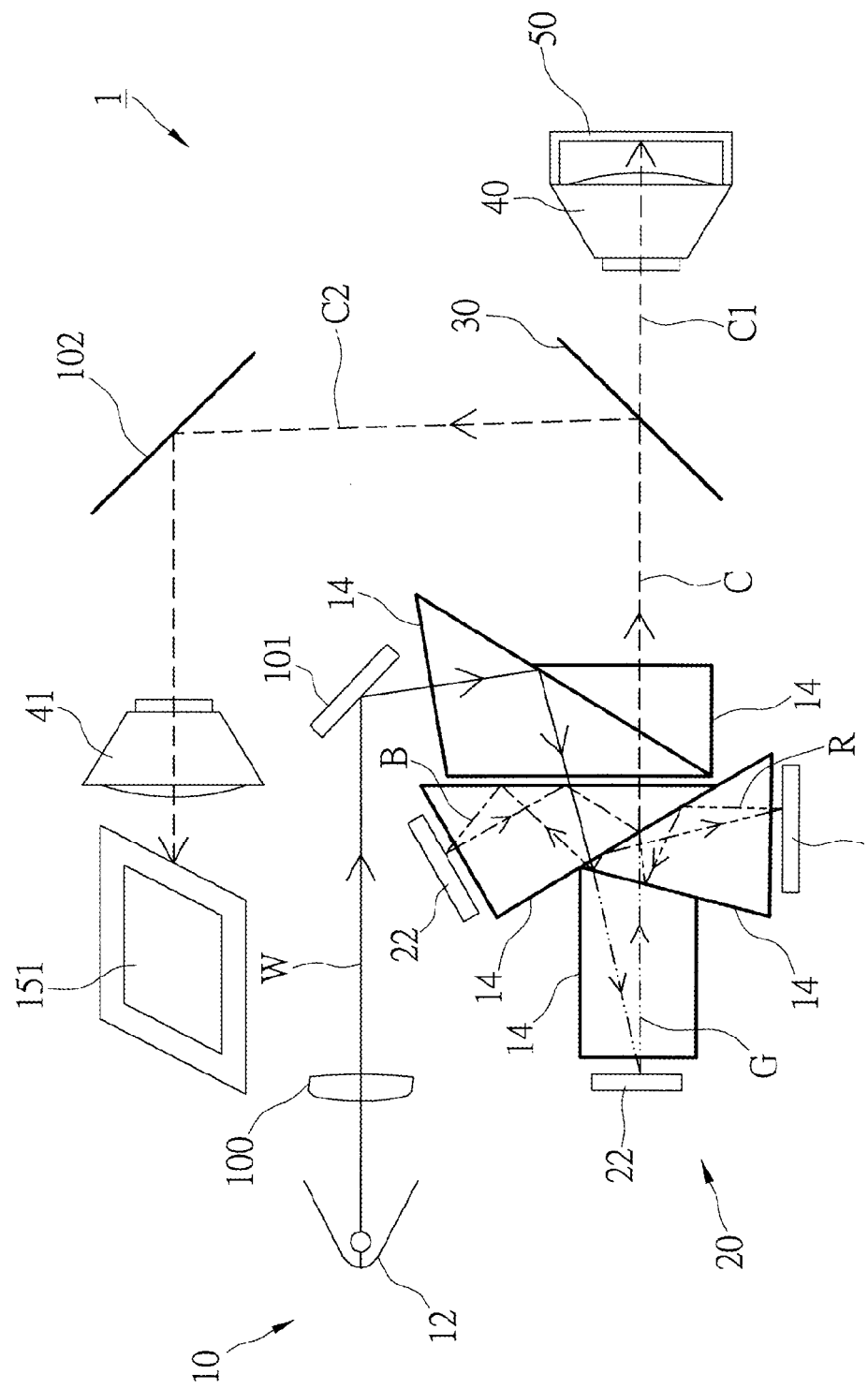

The projector 1 of the present invention may be provided with a lid 50 as shown in FIG. 3 and FIG. 4. The lid 50 may cover the first image lens 40 or cover the second image lens 41 that the projector 1 of the present invention only project image onto one screen via the uncovered image lens 40 or 41.

In conclusion, the projector 1 of the present invention may project slides onto two screens at different positions. It may project slides onto one screen as same as the conventional device by the lid 50.

Figure 5:
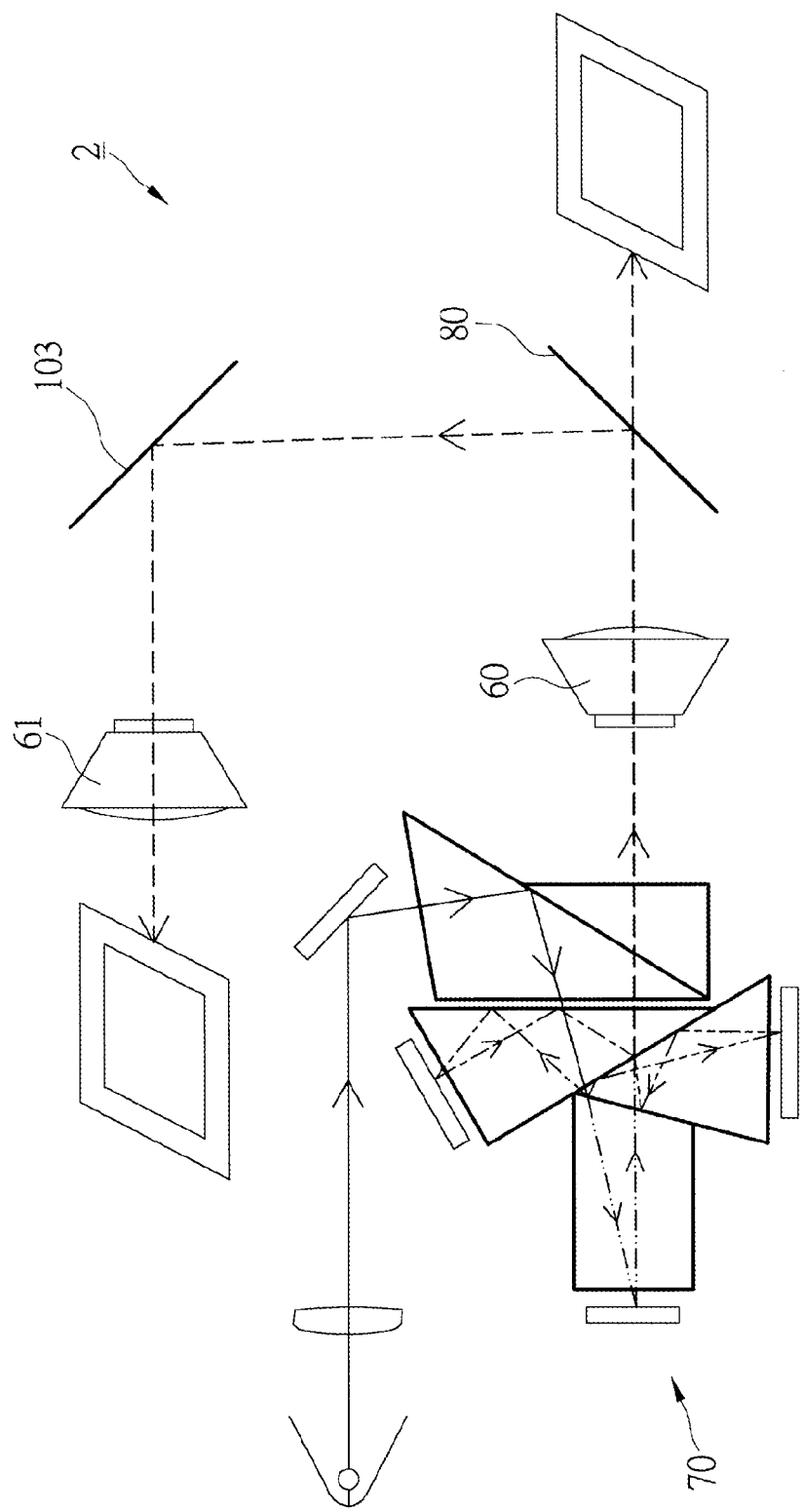
FIG. 5 is a sketch diagram of a second preferred embodiment of the present invention.
Figure 6:
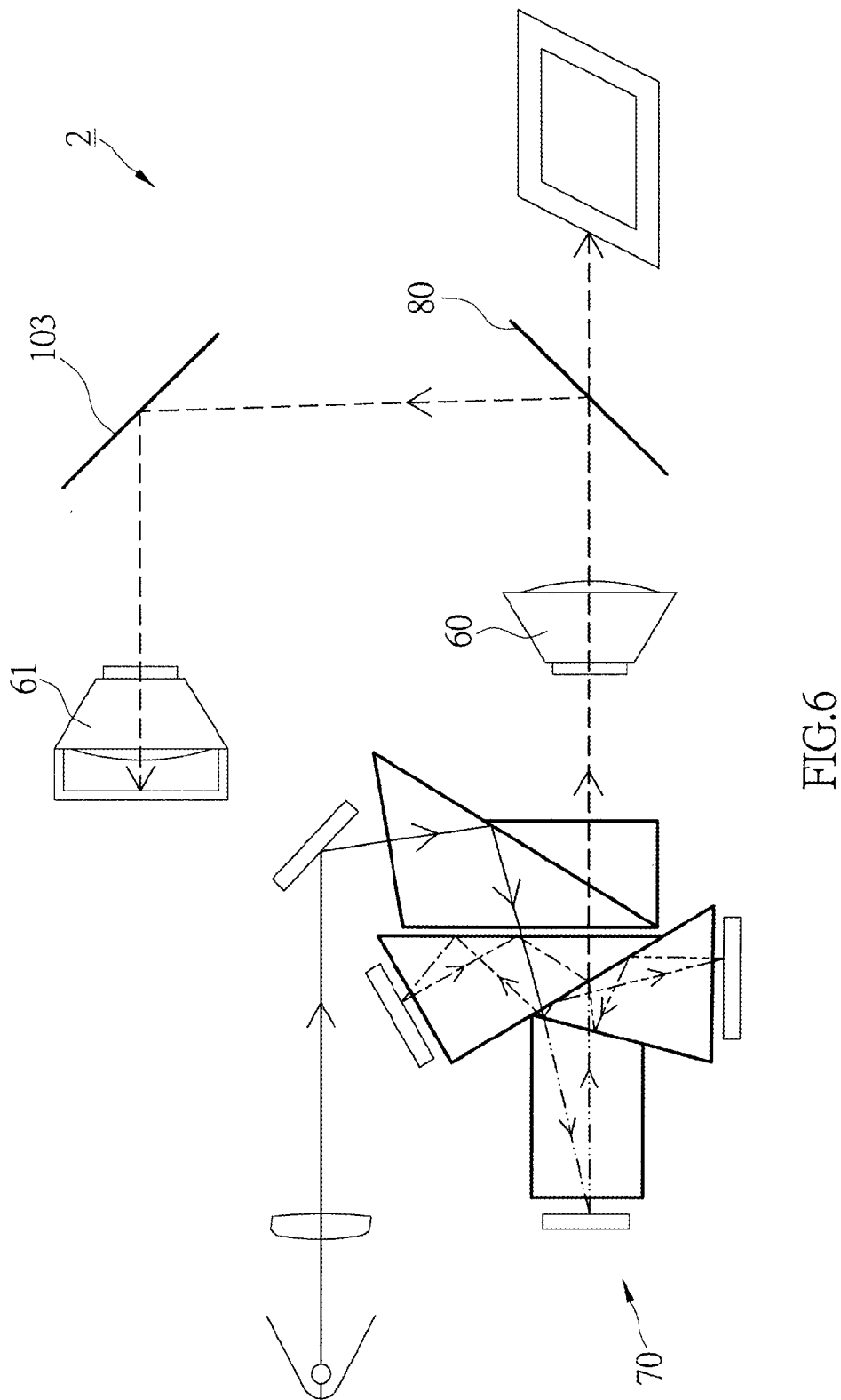
FIG. 6 is a sketch diagram of the second preferred embodiment of the present invention, showing a mask covering the second imaging lens.
Figure 7:
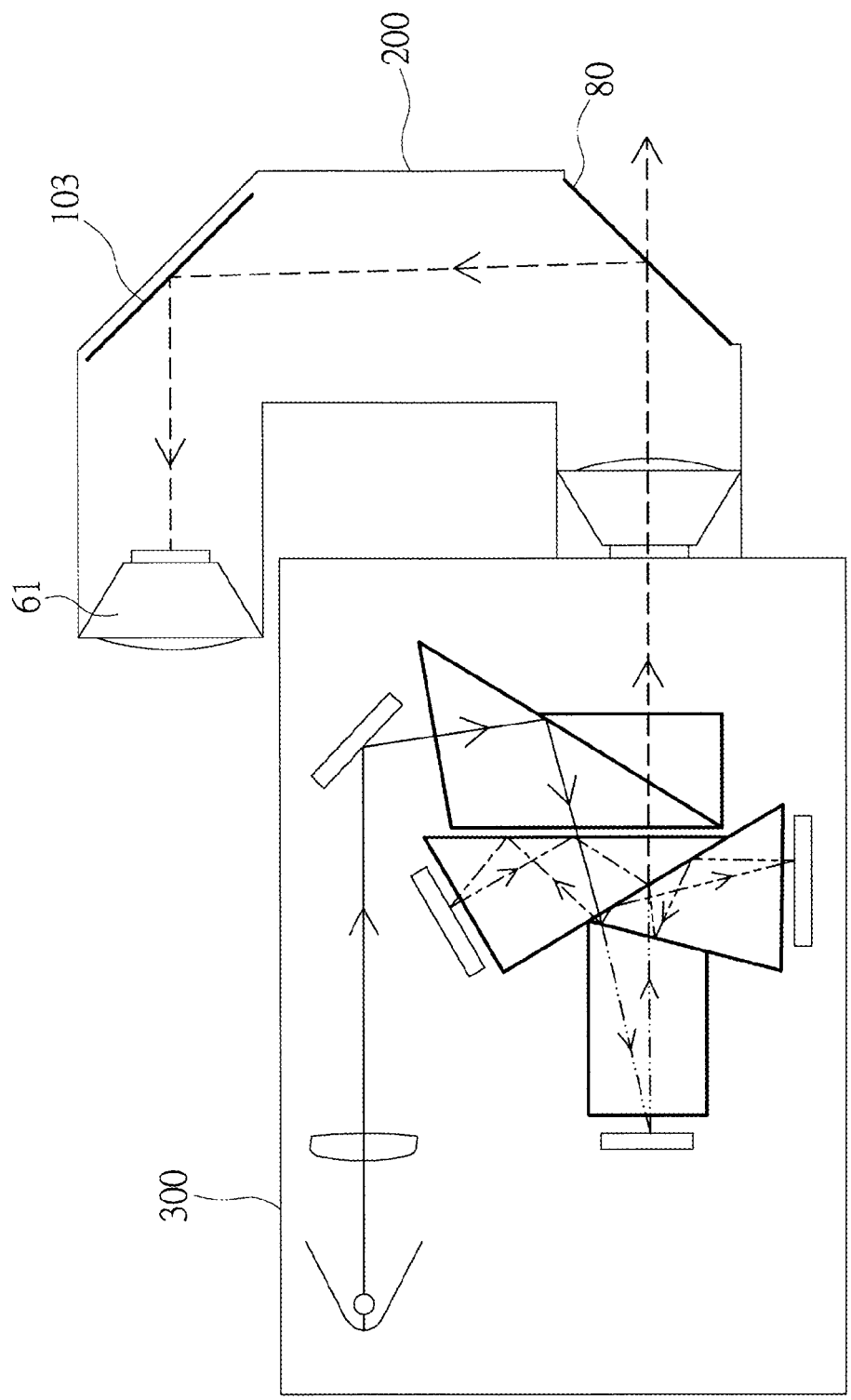
FIG. 7 is a sketch diagram of the present invention installed on the conventional projector that the projector may project slides onto two screens.

As shown in FIG. 5, a bidirectional projector 2 of the second preferred embodiment of the present invention, which is similar to the first preferred embodiment, except that a first image lens 60 is arranged between an imaging device 70 and the optical lens 80 that the optical lens 80 may split the image beam into two beams, one of which emits to the first image member and the other of which emits to second image member via a reflector 103 and a second image lens 61. The projector 2 of the second preferred embodiment may be provided with a lid as shown in FIG. 6 to project slides on one screen only. As shown in FIG. 7, the optical lens 80, the reflector 103, and the second image lens 61 may be made into an independent device 200 to be installed on a lens of a conventional projector 300 that the projector 300 may project slides on two screens at the same time.

The description above is a few preferred embodiments of the present invention, and the equivalence of the present invention is still in the scope of claim construction of the present invention.

What is claimed is:

1. A bidirectional projector, comprising:

a light source emitting red beam, green beam, and blue beam;

at least an imaging device receiving the red beam, the green beam, and the blue beam from the light source and reflecting predetermined parts of the red beam, the green beam, and the blue beam to form an image beam according to image signals;

an optical lens, wherein the image beam emits to the optical lens and a part of the image beam passes through the optical lens to form a first projecting beam, and a part of the image beam is reflected by the optical lens to form a second projecting beam;

a first image lens, wherein the first projecting beam emits to the first image lens, and the first image lens images the first projecting beam onto a first imaging member;

a second image lens, wherein the second projecting beam emits to the second image lens, and the second image lens images the second projecting beam onto a second imaging member; and a reflector, arranged between the optical lens and the second image lens, to reflect and change the direction of the second projecting beam to the second image lens;

wherein an incidence angle of the image beam to the optical lens is between 0 degrees and 90 degrees.

2. The bidirectional projector as defined in claim 1, wherein an incidence angle of the image beam emitting to the optical lens is between 40 degrees and 50 degrees.

3. The bidirectional projector as defined in claim 1, wherein the first image lens is between the image device and the optical lens.

* * * * *